US012745030B2

(12) United States Patent
Susmitha et al.

(10) Patent No.: US 12,745,030 B2
(45) Date of Patent: Sep. 22, 2026

(54) AUDIO RELAY ACROSS MULTIPLE DEVICES

(71) Applicant: QUALCOMM Incorporated, San Diego, CA (US)

(72) Inventors: Akula Susmitha, Tadepalli (IN); Srikanth Chintala, Hyderabad (IN); Sankar V.S. Gonella, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 18/593,749

(22) Filed: Mar. 1, 2024

(65) Prior Publication Data

US 2025/0280221 A1 Sep. 4, 2025

(51) Int. Cl.

| | |
|---|---|
| ***H04R 3/12*** | (2006.01) |
| ***G06F 3/16*** | (2006.01) |
| ***H04R 1/10*** | (2006.01) |

(52) U.S. Cl.

CPC .......... *H04R 1/1016* (2013.01); *G06F 3/165* (2013.01); *H04R 3/12* (2013.01); *H04R 2420/07* (2013.01)

(58) Field of Classification Search

CPC .... H04R 3/12; H04R 1/1016; H04R 2420/07; G06F 3/165

USPC ..................................................... 381/77–82

See application file for complete search history.

(56) References Cited

U.S. PATENT DOCUMENTS

| | | | | |
|---|---|---|---|---|
| 8,159,990 | B2 * | 4/2012 | Haartsen | H04L 1/0003 370/312 |
| 9,602,925 | B2 * | 3/2017 | Chukka | H04R 1/1091 |
| 9,743,367 | B2 * | 8/2017 | Das | H04L 69/324 |
| 11,573,761 | B2 * | 2/2023 | Bonde | H04W 12/50 |
| 12,096,187 | B2 * | 9/2024 | Millington | H04L 12/282 |
| 12,210,797 | B2 * | 1/2025 | Wilberding | G06F 3/165 |
| 12,265,754 | B2 * | 4/2025 | Bonde | G06F 3/165 |
| 2005/0160270 | A1 | 7/2005 | Goldberg et al. | |

FOREIGN PATENT DOCUMENTS

| | | |
|---|---|---|
| CN | 111782176 A | 10/2020 |

OTHER PUBLICATIONS

International Search Report and Written Opinion PCT/US2025/011742 ISA/EPO Apr. 15, 2025.

* cited by examiner

*Primary Examiner* — Disler Paul

(74) *Attorney, Agent, or Firm* — QUALCOMM Incorporated; Espartaco Diaz Hidalgo

(57) ABSTRACT

Systems and techniques are described herein for processing audio data. For example, a first computing device can include receive audio data from a second computing device via a communications protocol over a wireless channel. The first computing device can output, to a first audio device associated with the first computing device, the audio data for playing the audio data. The audio data is played simultaneously on the first audio device associated with the first computing device and on a second audio device associated with the second computing device.

20 Claims, 12 Drawing Sheets

1100

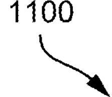

Receive, By The First Computing Device, Audio Data From A Second Computing Device Via A Communications Protocol Over A Wireless Channel
1110

Output, By The First Computing Device To A First Audio Device Associated With The First Computing Device, The Audio Data For Playing The Audio Data, Wherein The Audio Data Is Played Simultaneously On The First Audio Device Associated With The First Computing Device And On A Second Audio Device Associated With The Second Computing Device
1120

FIG. 11

AUDIO RELAY ACROSS MULTIPLE DEVICES

FIELD

The present disclosure generally relates to processing audio data. For example, aspects of the present disclosure relate to audio relay across multiple devices.

BACKGROUND

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for audio relay across multiple devices. According to at least one example, a first computing device for processing audio is provided. The first computing device includes at least one memory and at least one processor coupled to the at least one memory and configured to: receive audio data from a second computing device via a communications protocol over a wireless channel; and output, to a first audio device associated with the first computing device, the audio data for playing the audio data, wherein the audio data is played simultaneously on the first audio device associated with the first computing device and on a second audio device associated with the second computing device.

In another illustrative example, a method is provided for processing audio. The method includes: receiving, by the first computing device, audio data from a second computing device via a communications protocol over a wireless channel; and outputting, by the first computing device to a first audio device associated with the first computing device, the audio data for playing the audio data, wherein the audio data is played simultaneously on the first audio device associated with the first computing device and on a second audio device associated with the second computing device.

In another illustrative example, a non-transitory computer-readable medium of a first computing device is provided having stored thereon instructions that, when executed by at least one processor, cause the at least one processor to: receive audio data from a second computing device via a communications protocol over a wireless channel; and output, to a first audio device associated with the first computing device, the audio data for playing the audio data, wherein the audio data is played simultaneously on the first audio device associated with the first computing device and on a second audio device associated with the second computing device.

In another illustrative example, a first computing device for processing audio is provided. The first computing device includes: means for receiving audio data from a second computing device via a communications protocol over a wireless channel; and means for outputting, to a first audio device associated with the first computing device, the audio data for playing the audio data, wherein the audio data is played simultaneously on the first audio device associated with the first computing device and on a second audio device associated with the second computing device Aspects generally include a method, apparatus, system, computer program product, non-transitory computer-readable medium, user equipment, base station, wireless communication device, and/or processing system as substantially described herein with reference to and as illustrated by the drawings and specification.

In some aspects, each of the apparatuses described above is, can be part of, or can include an audio device, a mobile device (e.g., a mobile telephone or so-called "smart phone" or other mobile device), a smart or connected device, a camera system, an extended reality (XR) device (e.g., a virtual reality (VR) device, an augmented reality (AR) device, or a mixed reality (MR) device), a television, a vehicle, a wearable device, a personal computer, a laptop computer, a tablet device (also referred to as a tablet computer), a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 11 is a flow chart illustrating an example of a process for wireless communications, in accordance with some aspects of the present disclosure.

DETAILED DESCRIPTION

Figure 1:
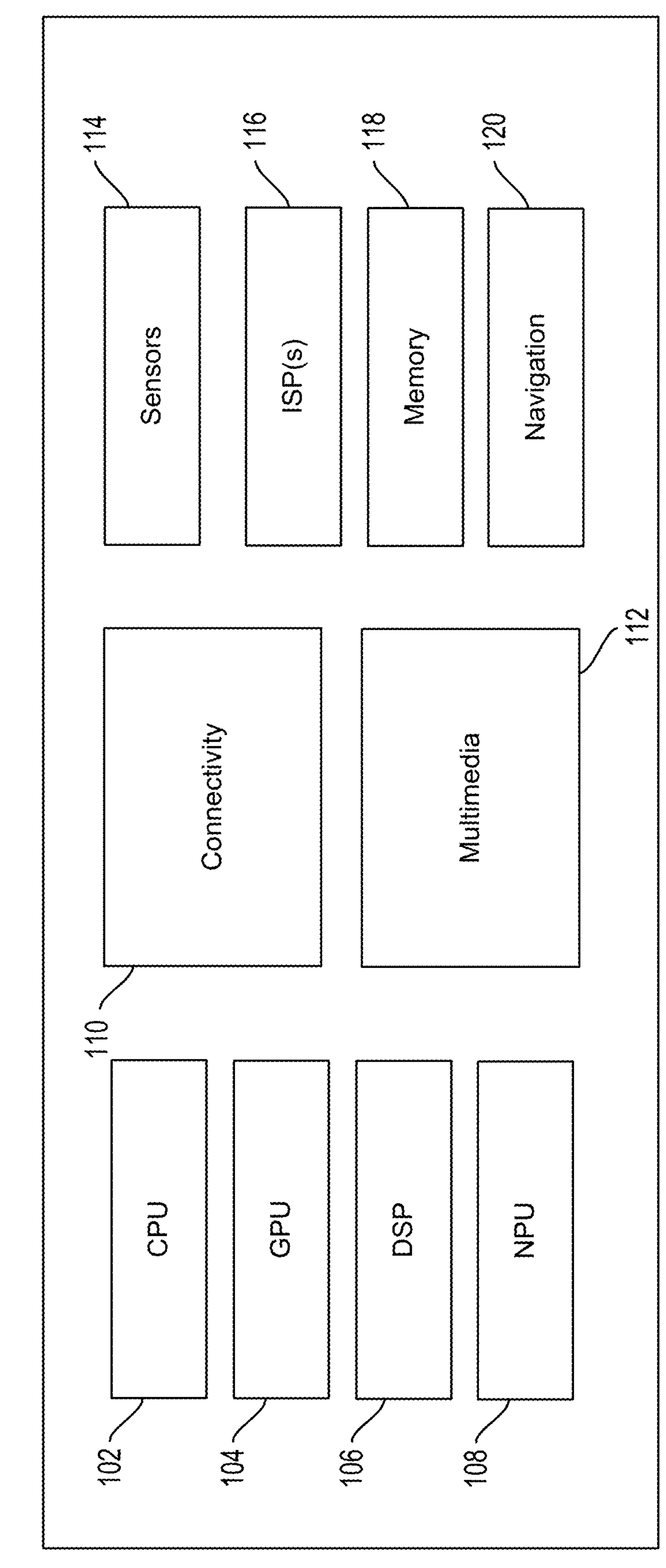
FIG. 1 illustrates an example implementation of a system-on-a-chip (SOC), in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms “exemplary” and/or “example” are used herein to mean “serving as an example, instance, or illustration.” Any aspect described herein as “exemplary” and/or "example" is not necessarily to be construed as preferred or advantageous over other aspects. Likewise, the term "aspects of the disclosure" does not require that all aspects of the disclosure include the discussed feature, advantage or mode of operation.

Short range wireless communication protocols enable wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz. BLUETOOTH® Low Energy (BLE) is a form of BLUETOOTH® communication that allows for communication with devices that operate using low power. Such devices may include beacons, which are wireless communication devices that can use low-energy communication technology for positioning, proximity marketing, or other purposes.

Audio devices (e.g., such as wireless earbuds and wired headsets) are becoming increasingly popular and are commonly owned among the general public. Typically, audio devices interact with a source device (e.g., a broadcast source device) to receive monophonic (mono) or stereophonic (stereo) audio data, either directly from the broadcast source devices themselves or indirectly from the broadcast source devices via a relay(s). Many use cases (e.g., involving downloading audio, such as music) use services that involve a computing device (e.g., a mobile device such as a smart phone, a television, a tablet device, or other computing device) or a central device (e.g., a server) that operates as the origin of the service.

Currently, audio data (e.g., monophonic or stereophonic audio data) can be streamed from computing devices (e.g., broadcast source devices, such as in the form of mobile phones, tablet devices, televisions, etc.) to audio devices (e.g., a wired headsets and/or wireless earbuds) via wireless communications, such as BLE communications. However, currently, there are limitations with wireless communications (e.g., BLE communications) as to the number of audio devices that a single computing device can simultaneously stream audio data for simultaneous playback of the audio.

In one example scenario for streaming audio, a group of people are gathered in close proximity to one another. One person within the group is playing audio (e.g., a song) on his associated computing device (e.g., mobile phone, tablet device, television, etc.). The other people within the group would like to simultaneously listen to (e.g., stream to play) the audio on their respective associated wireless audio devices (e.g., earbuds). The Bluetooth standard allows for the simultaneous streaming of audio data from a computing device to a maximum of two different wireless audio devices (e.g., two different pair of wireless earphones or earbuds) for simultaneous playback of the audio. As such, currently, BLE communications does not allow for the simultaneous streaming of audio data from a computing device to more than two different wireless audio devices (e.g., two different pairs wireless earphones or earbuds) for simultaneous playback of the audio.

In another example scenario for streaming audio, a person is playing audio (e.g., a song) on his associated computing device (e.g., mobile phone, tablet device, television, etc.). The person is simultaneously listening to the audio on his associated wired audio device (e.g., wired headset). Another person, located within close proximity to the person, would like to simultaneously listen to (e.g., stream to play) the audio on their associated wireless audio device (e.g., earbuds). Currently, there is no wireless technology that allows for simultaneous streaming of audio data on a wired audio device (e.g., wired headset) and on a wireless audio device (e.g., earbuds) for simultaneous playback of the audio.

In yet another example scenario for streaming audio, a group of people are gathered in close proximity to one another, where each person has a respective associated computing device (e.g., mobile phone, tablet device, television, etc.). A person in the group can be playing audio (e.g., a song) on an associated computing device (e.g., mobile phone, tablet device, television, etc.). The other people in the group may like to simultaneously listen to (e.g., stream to play) the audio on their respective associated wired audio devices (e.g., wired headsets), which are connected to their respective associated computing devices (e.g., mobile phones, tablet device, television, etc.). Currently, there is no wireless technology that allows for the simultaneous streaming of audio data from a computing device to more than one wired audio device (e.g., wired headset) for simultaneous playback of the audio.

As such, improved systems and techniques that allow for simultaneous streaming of audio data from one computing device (e.g., mobile phone, tablet device, television, etc.) across multiple audio devices (e.g., wired headsets and/or wireless earbuds) for simultaneous playback of the audio can be beneficial.

In some aspects of the present disclosure, systems, apparatuses, methods (also referred to as processes), and computer-readable media (collectively referred to herein as "systems and techniques") are described herein for audio relay across multiple devices (e.g., mobile phones or other computing device, earbuds, and headsets).

Various aspects relate generally to wireless communications. Some aspects more specifically relate to systems and techniques that provide solutions for simultaneous streaming of audio data from one computing device (e.g., mobile phone, tablet device, television, etc.) across multiple audio devices (e.g., wired headsets and/or wireless earbuds) for simultaneous playback of the audio. In one or more aspects, a communications protocol, such as a distributed context fabriq (DCF) protocol, is employed in conjunction with a wireless channel (e.g., a Bluetooth channel, such as for BLE communications) to be able to simultaneously stream audio data (e.g., monophonic or stereophonic audio data) from a computing device (e.g., a broadcast source device, such as in the form of a mobile phone, tablet device, television, or other device) to a plurality of audio devices (e.g., a wired headsets and/or wireless earbuds) for simultaneous playback of the audio.

In one or more examples, during operation for wireless communications, a first computing device (e.g., a first mobile device, tablet device, television, etc.) can receive audio data from a second computing device (e.g., a second mobile device, tablet device, television, etc.) via a communications protocol over a wireless channel. The first computing device can output (to a first audio device associated with the first computing device, such as a first pair of wireless earbuds or a first wired headset) the audio data for playing the audio data. The audio data is played simultaneously on the first audio device associated with the first computing device and on a second audio device (e.g., a second pair of wireless earbuds or a second wired headset) associated with the second computing device.

In one or more examples, the first computing device is connected to the second computing device via the communications protocol over the wireless channel. In some examples, the audio data is output from the first computing device to the first audio device via a wired connection or a wireless connection. In one or more examples, the audio data is transmitted from the first computing device to the first audio device via the communications protocol over the wireless channel. In some examples, the communications protocol is a DCF protocol. In one or more examples, the wireless channel is a Bluetooth channel.

Particular aspects of the subject matter described in this disclosure can be implemented to realize one or more of the following potential advantages. In some examples, the systems and techniques, by employing a communications protocol (e.g., DCF protocol) over a wireless channel (e.g., a Bluetooth channel), can allow for a reduction in power consumption by devices (e.g., computing devices and audio devices) because the wireless communications (e.g., BLE communications) can be low energy. The communications protocol (e.g., DCF protocol) can allow for a reliable solution for simultaneously streaming audio data on multiple audio devices for simultaneous playback of the audio because the communications protocol (e.g., DCF protocol) itself is reliable.

Additional aspects of the present disclosure are described in more detail below.

As used herein, the term "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118. In some cases, the SOC 100 may be based on an ARM instruction set.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia block 112 that may, for example, process and/or decode audio data. In some cases, the connectivity block 110 may provide multiple connections to various networks. For example, the connectivity block 110 may provide a connection to the Internet, via the 5G connection, as well as a connection to a personal device, such as a wireless headset, via the Bluetooth connection. In some cases, the multimedia block 112 may process multimedia data for transmission via the connectivity block 110. For example, the multimedia block 112 may receive an audio bitstream, for example, via the connectivity block 110 and multimedia block 112 encode (e.g., transcode, re-encode) the audio bitstream to an audio format supported by a wireless headset that is connected via the connectivity block 110. The encoded audio bitstream may then be transmitted to the wireless headset via the connectivity block 110.

Figure 2:
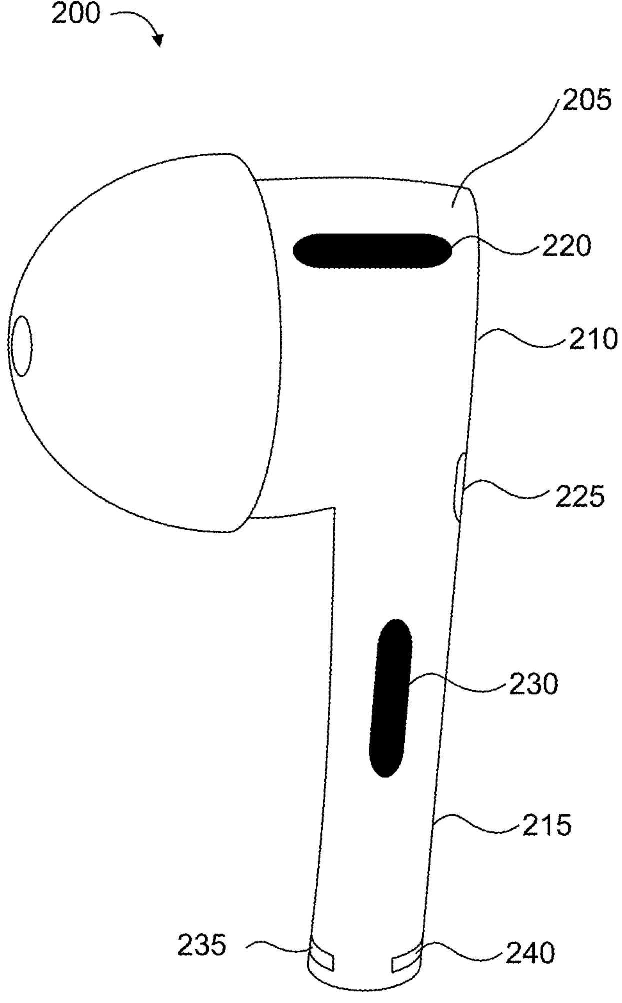
FIG. 2 illustrates an example wireless audio device in the form of earbuds, in accordance with some aspects of the present disclosure.

FIG. 2 illustrates an example wireless audio device 200 in the form of an earbud. The wireless audio device 200 provides a single channel of audio, either a left channel or a right channel, and can be operated with another wireless audio device (not shown) to provide two channels of audio (e.g., a left channel and a right channel).

According to some embodiments, each wireless audio device 200 can include a housing 205 formed of a body 210 and a stem 215 extending from body 210. In some aspects, the housing 205 can be formed of a monolithic outer structure such as a molded plastic. The body 210 can include an internally facing microphone 220 and an externally facing microphone 225. Externally facing microphone 225 can be positioned within an opening defined by portions of body 210 and stem 215. By extending into both body 210 and stem 215, microphone 225 can be large enough to receive sounds from a broader area proximate to the listener. In some embodiments, the housing 205 can define an acoustic port that can direct sound from an internal audio driver out of housing 205 and into a listener's ear canal. In other embodiments, wireless audio device 200 can include a deformable ear tip that can be inserted into a listener's ear canal enabling the wireless listening devices to be configured as in-ear hearing devices.

In one example, the stem 215 has a substantially cylindrical construction along with a planar region 230 that does not follow the curvature of the cylindrical construction. The planar region 230 can indicate an area where the wireless listening device is capable of receiving listener input. For instance, in some embodiments listener input can be inputted by squeezing stem 215 at planar region 230. In some embodiments, planar region 230 can include a touch-sensitive surface in addition to or instead of pressure sensing capabilities, that allow a listener to input touch commands, such as contact gestures. Stem 215 can also include electrical contact 235 and electrical contact 240 for contacting with corresponding electrical contacts in the charging case (e.g., charging case 350 in FIG. 3).

The wireless audio device 200 can include several features that can enable the devices to be comfortably worn by a listener for extended periods of time and even all day. The housing 205 can be shaped and sized to fit securely between the tragus and anti-tragus of a listener's ear so that the portable listening device is not prone to falling out of the ear even when a listener is exercising or otherwise actively moving. Its functionality can also enable wireless audio device 200 to provide an audio interface to the host device (e.g., host device 310 of FIG. 3) so that the listener may not need to utilize a graphical interface of the host device. The audio device 200 can be sufficiently sophisticated to enable the listener to perform day-to-day operations from the host device solely through interactions with a wireless audio device 200. This can create further independence from the host device by not requiring the listener to physically interact with, and/or look at the display screen of, the host device, especially when the functionality of wireless audio device 200 is combined with the voice control capabilities of the host device. Thus, wireless audio device 200 can enable a wireless and a hands-free experience for the listener.

The wireless audio device 200 can also include various components that cannot be visually perceived. For example, the wireless audio device 200 can include at least one sensor for detecting various aspects of the device. Illustrative aspects of the device include, the state of the device (e.g., whether the wireless audio device 200 is attached to a person), pose information related to a listener, biometric information (e.g., the temperature of the listener), and so forth. At least one of the sensors of the wireless audio device 200 can be configured to output pose information that identifies an orientation of the listener's head with respect to a neutral position (e.g., a neutral head position). The pose information may be used by a host device and the host device may be configured to alter an audio stream presented to the wireless audio device 200 to provide a spatial audio stream that provides a 3D virtual auditory space.

Figure 3:
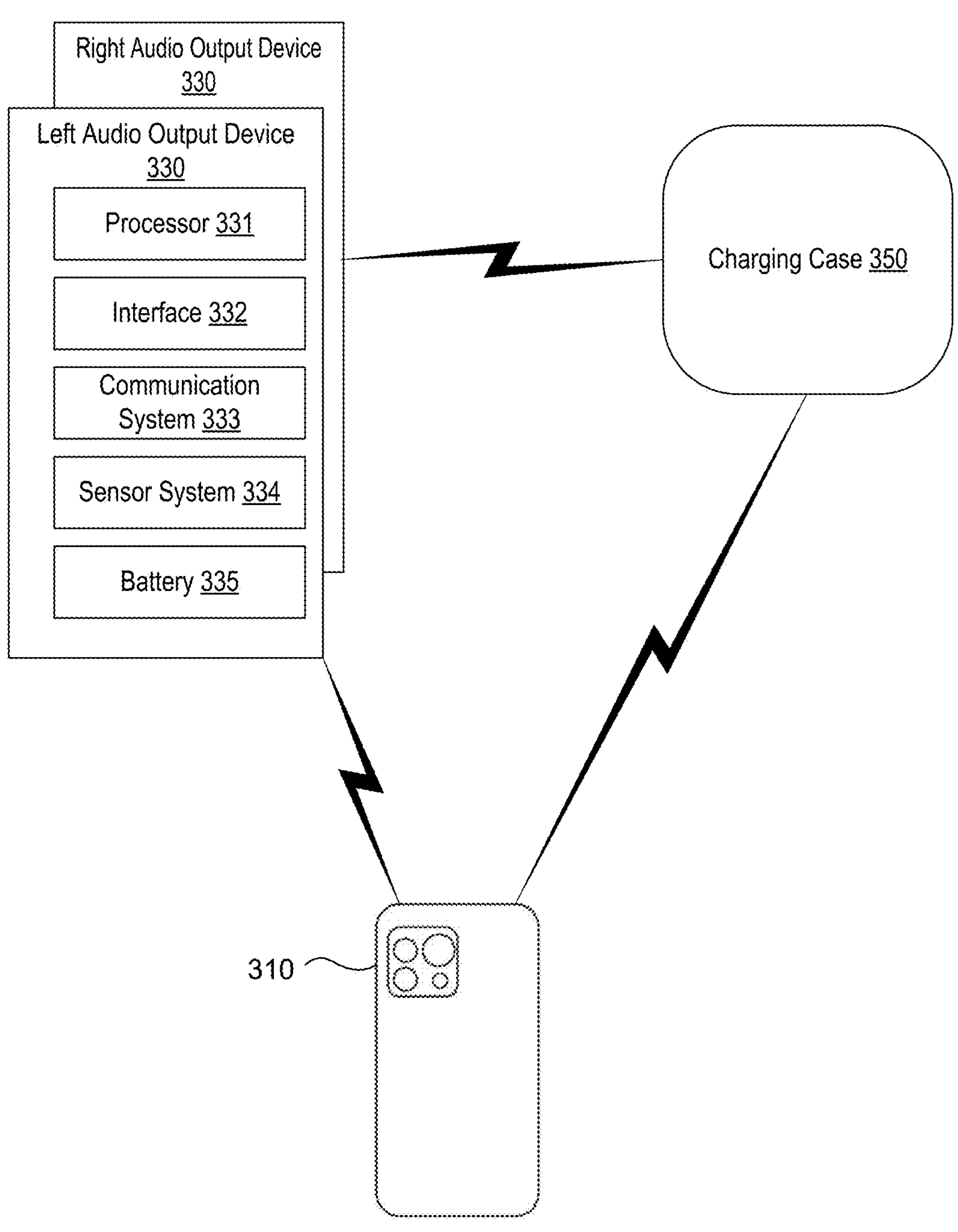
FIG. 3 illustrates a conceptual diagram of a wireless audio system that may be configured to use a single audio device, in accordance with some aspects of the present disclosure.

FIG. 3 illustrates a conceptual diagram of a wireless audio system 300 that may be configured to use a single audio device according to various aspects of the disclosure. The wireless audio system 300 includes a host device 310, a pair of audio devices 330 (e.g., a left audio device 330 and a right audio device 330, which may each be in the form of an earbud), and a charging case 350.

The host device 310 is depicted in FIG. 3 as a mobile communication device (e.g., a mobile phone, such as a smartphone), but can be any electronic device (e.g., a tablet device, a television, or other computing device) that can transmit audio data to a wireless audio device (e.g., the wireless audio device 300 of FIG. 2). Other, non-limiting examples of suitable host devices 310 include a laptop computer, a desktop computer, a tablet device (or tablet computer), a smartwatch, an audio system, a video player, and the like.

In some aspects, each audio device 330 can receive and generate sound to provide an enhanced user interface for the host device 310. The audio device 330 can include a processor 331 that executes computer-readable instructions stored in a memory (not shown) for performing a plurality of functions for the audio device 330. In some examples, the processor 331 can be one or more suitable computing devices, such as microprocessors, computer processing units (CPUs), digital signal processing units (DSPs), field programmable gate arrays (FPGAs), application-specific integrated circuits (ASICs) and the like.

The processor 331 can be operatively coupled to an interface 332, a communication system 333, and a sensor system 334 for the audio device 330 to perform one or more functions. For instance, the interface 332 can include a driver (e.g., speaker) for outputting sound to a user, one or more microphones for inputting sound from the environment or the user, one or more light emitting diodes (LEDs) for providing visual notifications to a user, a pressure sensor or a touch sensor (e.g., a resistive or capacitive touch sensor) for receiving user input, and/or any other suitable input or output device. The communication system 333 can include wireless and wired communication components for enabling the audio device 330 to send and receive data/commands from the host device 310. For example, the communication system 333 can include circuitry that the audio device 330 to communicate with host device 310 over wireless link 360, which be implemented by a standard (e.g., Bluetooth, Wi-Fi Direct, Zigbee, etc.) or a proprietary communication link. The communication system 333 can also enable the audio device 330 to wirelessly communicate with the charging case 350 via a wireless link.

In some aspects, the sensor system 334 can include proximity sensors (e.g., optical sensors, capacitive sensors, radar, etc.), accelerometers, microphones, and any other type of sensor that can measure a parameter of an external entity and/or environment.

The audio device 330 may also include a battery 335, (e.g., a suitable energy storage device such as a lithium ion battery, etc.) that is capable of storing energy and discharging stored energy to operate the audio device 330. The discharged energy can be used to power the electrical components of audio device 330. The battery 335 can be a rechargeable battery and permit charging as needed to replenish stored energy. For instance, the battery 338 can be coupled to battery charging circuitry (not shown) that is operatively coupled to receive power from a charging case interface (not shown). The case interface may include electrical contacts to electrically couple with the audio device 330 to the charging case 350. In some aspects, power can be received by the audio device 330 from charging case 350 via the electrical contacts within the charging case. In some aspects, the audio device 330 may be changed via an inductive communication interface via a wireless power receiving coil within the charging case 350.

The charging case 350 can include a battery (not shown) that can store and discharge energy to power circuitry to recharge the battery 335 of the audio device 330. As mentioned above, the audio device 330 may include electrical contacts (e.g., electrical contact 235 and electrical contact 240 of FIG. 2) that can transfer power to the audio device 330 through a wired electrical connection between contacts in the charging case. In some cases, the charging case 350 may be configured to facilitate a setup of a wireless connection between the host device 310 and the audio device 330.

The charging case 350 can also include a processor (not shown) and a communication system (not shown). The processor can be one or more processors, ASICs, FPGAs, microprocessors, and the like for operating the charging case 350. The processor can be coupled to an earbud interface and can control the charging function of the charging case 350 to recharge batteries 335 of the audio device 330, and the processor can also be coupled to a communication system for operating the interactive functionalities of the charging case with other devices, including the audio device 330. In one example, the communication system of the charging case 350 includes a Bluetooth component, or any other suitable wireless communication component, that wirelessly sends and receives data with the communication system 333 of the audio device 330. Towards this end, the charging case 350 and each audio device 330 can include an antenna formed of a conductive body to send and receive electromagnetic signals.

The charging case 350 can also include a user interface (e.g., a button, a speaker, a light emitter such as an LED, etc.) that can be operatively coupled to the processor to alert a user of various notifications. For example, the user interface can include a speaker that can emit audible noise capable of being heard by a user and/or one or more LEDs or similar lights that can emit a light that can be seen by a user. For example, the charging case 350 may output audio or light to indicate whether at least one audio device 330 is being charged by charging case 350 or to indicate whether the case battery is low on energy or being charged.

The host device 310 is configured to connect to the audio device 330 and provide audio information. The audio device 330 may also provide information in some contexts, such as whether the audio device 330 is attached to a listener. In some cases, the host device 310 can include a processor (not shown) that is coupled to a battery (not shown) and a host memory bank (not shown) containing lines of code executable by the host computing system (not shown) for operating the host device 310. The host device 310 can also include a host sensor system, e.g., accelerometer, gyroscope, light sensor, and the like, for allowing host device 310 to sense the environment, and a host user interface system, e.g., display, speaker, buttons, touch screen, and the like, for outputting information to and receiving input from a user. Additionally, the host device 310 can also include a communication system for allowing host device 310 to send and/or receive data, e.g., wireless fidelity (Wi-Fi), long term evolution (LTE), code division multiple access (CDMA), global system for mobiles (GSM), Bluetooth, and the like. The communication system of the host device 310 can also communicate with the communication system 333 via a wireless communication link so that the host device 310 can send audio data to the audio device 330 to output sound, and receive data from the audio device 330 to receive user inputs. The communication link can be any suitable wireless communication line such as Bluetooth connection. By enabling communication between the host device 310 and the audio device 330, the audio device 330 can enhance the user interface of host device 310.

As previously mentioned, audio devices (e.g., such as wireless earbuds and wired headsets) have been becoming increasingly popular and are commonly owned among the general public. Audio devices generally interact with a source device (e.g., a broadcast source device) to receive monophonic or stereophonic audio data, either directly from the broadcast source devices themselves or indirectly from the broadcast source devices via a relay(s). Use cases (e.g., involving downloading audio, such as music) can include services that involve a computing device (e.g., a mobile device such as a mobile phone, a tablet device, a television, etc.) or a central device (e.g., a server) that operates as the origin of the service.

Currently, audio data (e.g., monophonic or stereophonic audio data) may be streamed from computing devices (e.g., broadcast source devices, such as in the form of mobile phones, tablet devices, televisions, etc.) to audio devices (e.g., a wired headsets and/or wireless earbuds) via wireless communications (e.g., BLE communications). However, currently, there are limitations with wireless communications (e.g., BLE communications) as to the number of audio devices that a single computing device can simultaneously stream audio data for simultaneous playback of the audio.

Figure 4:
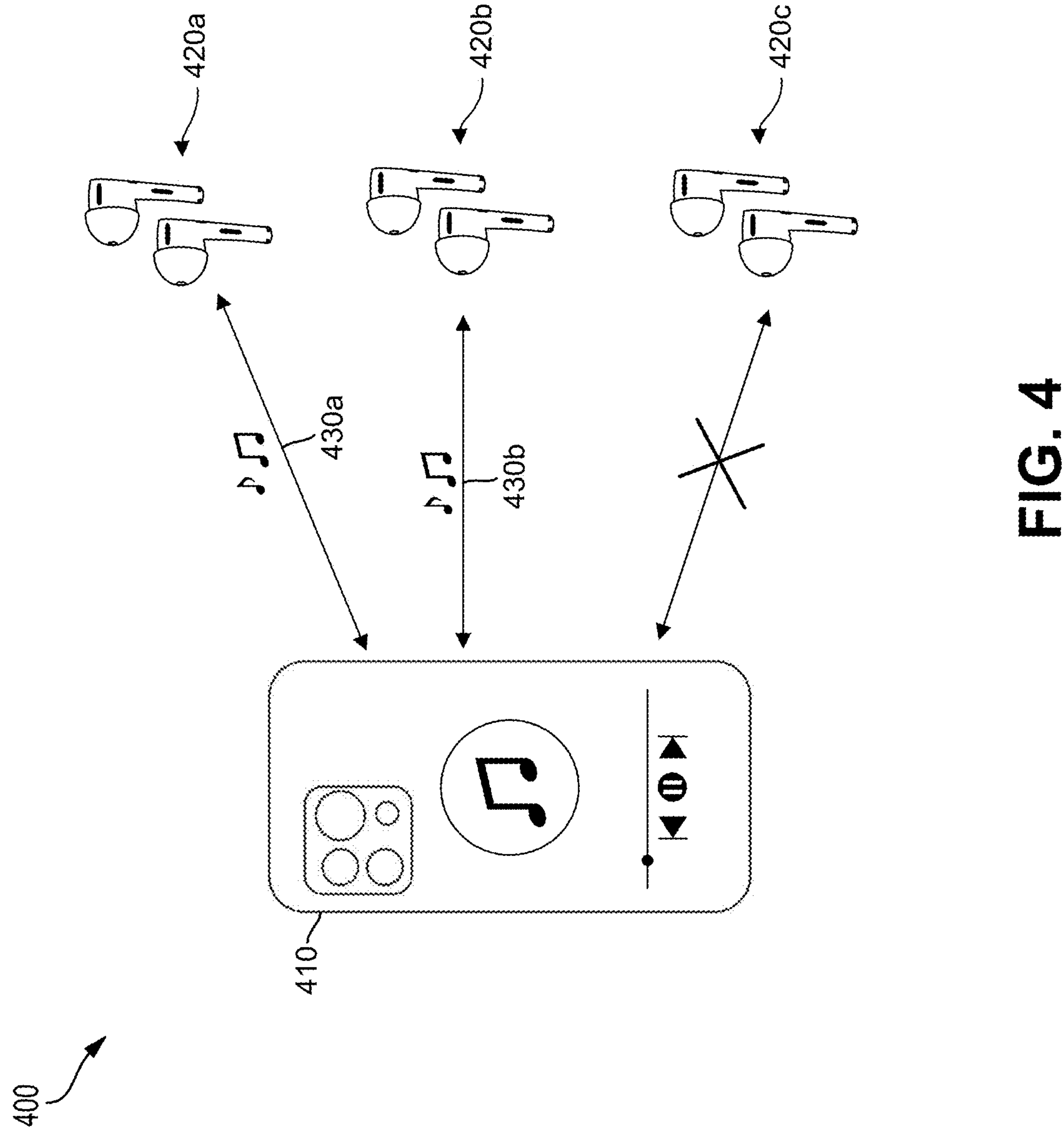
FIG. 4 is a diagram illustrating an example of a scenario where a computing device is attempting to provide simultaneous playback of audio on more than two wireless audio devices, in accordance with some aspects of the present disclosure.

One example scenario for streaming audio is shown in FIG. 4. In particular, FIG. 4 is a diagram illustrating an example of a scenario 400 where a computing device 410 is attempting to provide simultaneous playback of audio on more than two different wireless audio devices 420*a*, 420*b*, 420*c* (shown as distinct pairs of wireless audio devices or earbuds). For the scenario 400 of FIG. 4, a group of people are gathered in close proximity to one another (e.g., within BLE communications range). One person within the group has an associated computing device 410 (e.g., shown in the form of a mobile phone). The computing device 410 is depicted in FIG. 4 as a mobile communication device (e.g., a mobile phone, such as a smartphone), but can be any electronic device that can transmit audio data (e.g., audio data packets) to a wireless audio device (e.g., wireless audio devices 420*a*, 420*b*, 402*c* of FIG. 4). Other, non-limiting examples of suitable computing devices 410 include, but are not limited to, a laptop computer, a desktop computer, a television, a tablet device (or tablet computer), a smartwatch, an audio system, a video player, and the like. The other people within the group each have an associated wireless audio device 420*a*, 420*b*, 420*c* (e.g., each shown in the form of earbuds).

The person with the associated computing device 410 is playing audio (e.g., a song) on his associated computing device 410 (e.g., shown in the form of a mobile phone). The other people within the group would like to simultaneously listen to (e.g., stream to play) the audio on their respective associated wireless audio devices 420*a*, 420*b*, 420*c* (e.g., earbuds). The Bluetooth standard allows for the simultaneous streaming of audio data from a computing device to a maximum of two different wireless audio devices (e.g., two different/distinct pair of wireless earphones or earbuds) for simultaneous playback of the audio. As shown in FIG. 4, the computing device 410 is able to simultaneously stream (e.g., as denoted by arrows 430*a*, 430*b*) the audio data to two of the wireless audio devices 420*a*, 420*b* for simultaneous playback of the audio. However, the computing device 410 is not able to simultaneously stream the audio data to the remaining wireless audio device 420*c* for simultaneous playback of the audio. As such, currently, BLE communications does not allow for the simultaneous streaming of audio data from a computing device to more than two different wireless audio devices (e.g., two different/distinct pair of wireless earphones or earbuds) for simultaneous playback of the audio.

Figure 5:
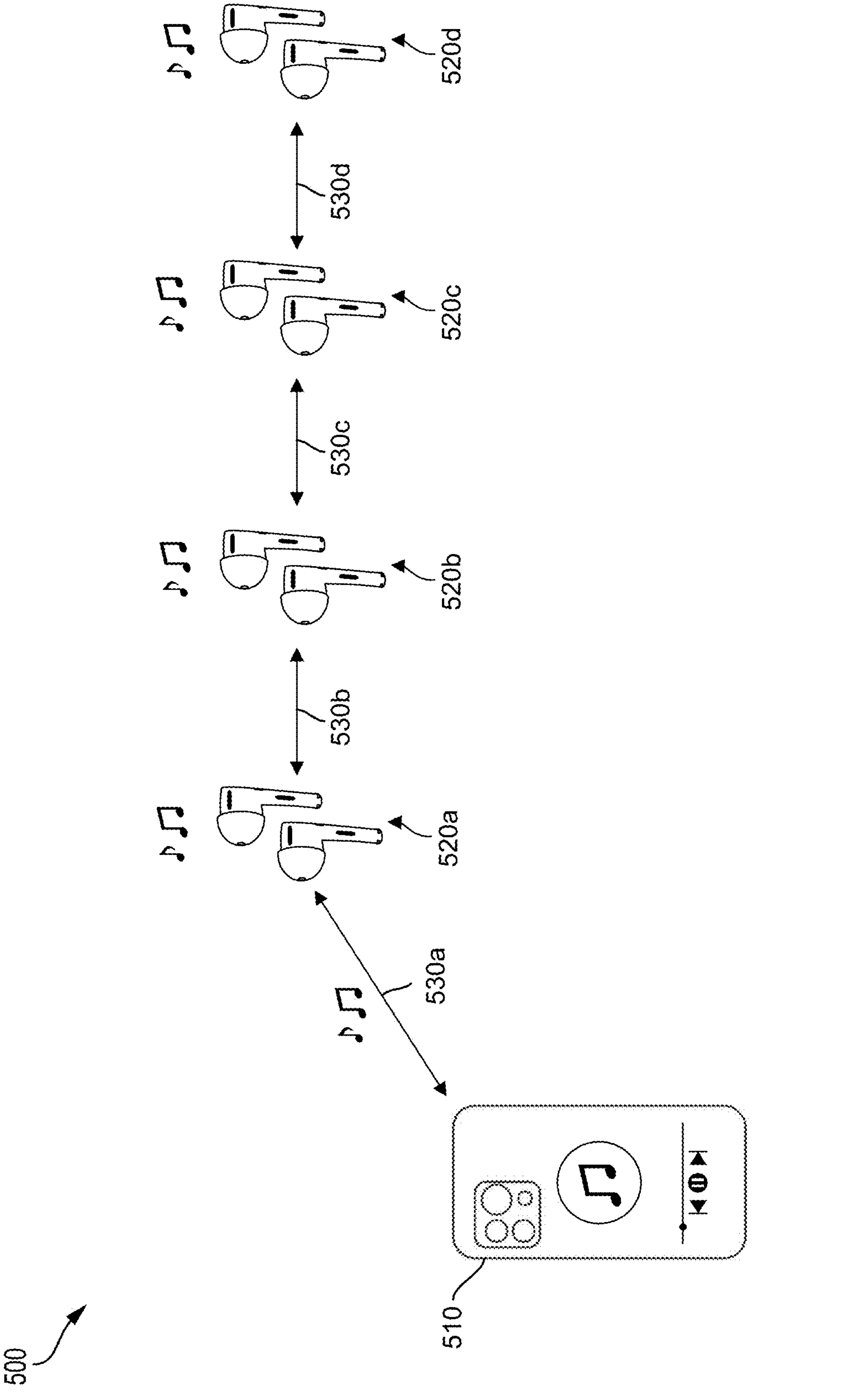
FIG. 5 is a diagram illustrating an example of a scenario where a computing device is providing simultaneous playback of audio on more than two wireless audio devices, in accordance with some aspects of the present disclosure.

The systems and techniques allow for the simultaneous streaming of audio data from a computing device to more than two different wireless audio devices (e.g., two different/distinct pair of wireless earphones or earbuds) for simultaneous playback of the audio by using a communications protocol (e.g., the DCF protocol) over a wireless channel (e.g., a Bluetooth channel). FIG. 5 shows an example of using a communications protocol (e.g., the DCF protocol) to allow for this feature. In particular, FIG. 5 is a diagram illustrating an example of a scenario 500 where a computing device 510 is providing simultaneous playback of audio on more than two different wireless audio devices 520*a*, 520*b*, 520*c*, 520*d* (e.g., two different/distinct pair of wireless earphones or earbuds). The DCF protocol (e.g., over a wireless channel, such as a Bluetooth channel) can be employed by the computing device 510 and by the wireless audio devices 520*a*, 520*b*, 520*c*, 520*d* in order to enable the simultaneous playback of audio on more than two wireless audio devices 520*a*, 520*b*, 520*c*, 520*d*.

In FIG. 5 (e.g., similar to FIG. 4), a group of people are gathered in close proximity to one another (e.g., within a range for BLE communications). One person within the group has an associated computing device 510 (e.g., a mobile phone, tablet device, television, etc.). The other people within the group each have a respective associated wireless audio device 520*a*, 520*b*, 520*c*, 520*d*. The person with the associated computing device 510 is playing audio (e.g., a song) on his associated computing device 510. The other people within the group would like to simultaneously listen to (e.g., stream to play) the audio on their respective associated wireless audio devices 520*a*, 520*b*, 520*c*, 520*d*.

In one or more examples, a DCF module may be operating on the computing device 510 and the wireless audio devices 520*a*, 520*b*, 520*c*, 520*d*. The computing device 510 is connected to the wireless audio device 520*a* via the DCF protocol over a wireless channel (e.g., Bluetooth channel), the wireless audio device 520*a* is connected to the wireless audio device 520*b* via the DCF protocol over a wireless channel (e.g., Bluetooth channel), the wireless audio device 520*b* is connected to the wireless audio device 520*c* via the DCF protocol over a wireless channel (e.g., Bluetooth channel), and the wireless audio device 520*c* is connected to the wireless audio device 520*d* via the DCF protocol over a wireless channel (e.g., Bluetooth channel).

The computing device 510 can stream (e.g., as denoted by arrow 530*a*) audio data packets to the first wireless audio device 520*a* via the DCF protocol over a wireless channel (e.g., Bluetooth channel). After receiving the audio data packets, the first wireless audio device 520*a* can stream (e.g., as denoted by arrow 530*b*) the audio data packets to the second wireless audio device 520*b* via the DCF protocol over a wireless channel (e.g., Bluetooth channel). After receiving the audio data packets, the second wireless audio device 520*b* can stream (e.g., as denoted by arrow 530*c*) the audio data packets to the third wireless audio device 520*c* via the DCF protocol over a wireless channel (e.g., Bluetooth channel). After receiving the audio data packets, the third wireless audio device 520*c* can stream (e.g., as denoted by arrow 530*d*) the audio data packets to the fourth wireless audio device 520*d* via the DCF protocol over a wireless channel (e.g., Bluetooth channel). As such, using the DCF protocol over a wireless channel (e.g., Bluetooth channel) via wireless connections in series with the devices, the computing device 510 is able to simultaneously stream (e.g., as denoted by arrows 530*a*, 530*b*, 530*c*, 530*d*) the audio data to all of the wireless audio devices 520*a*, 520*b*, 520*c*, 520*d* for simultaneous playback of the audio.

Figure 6:
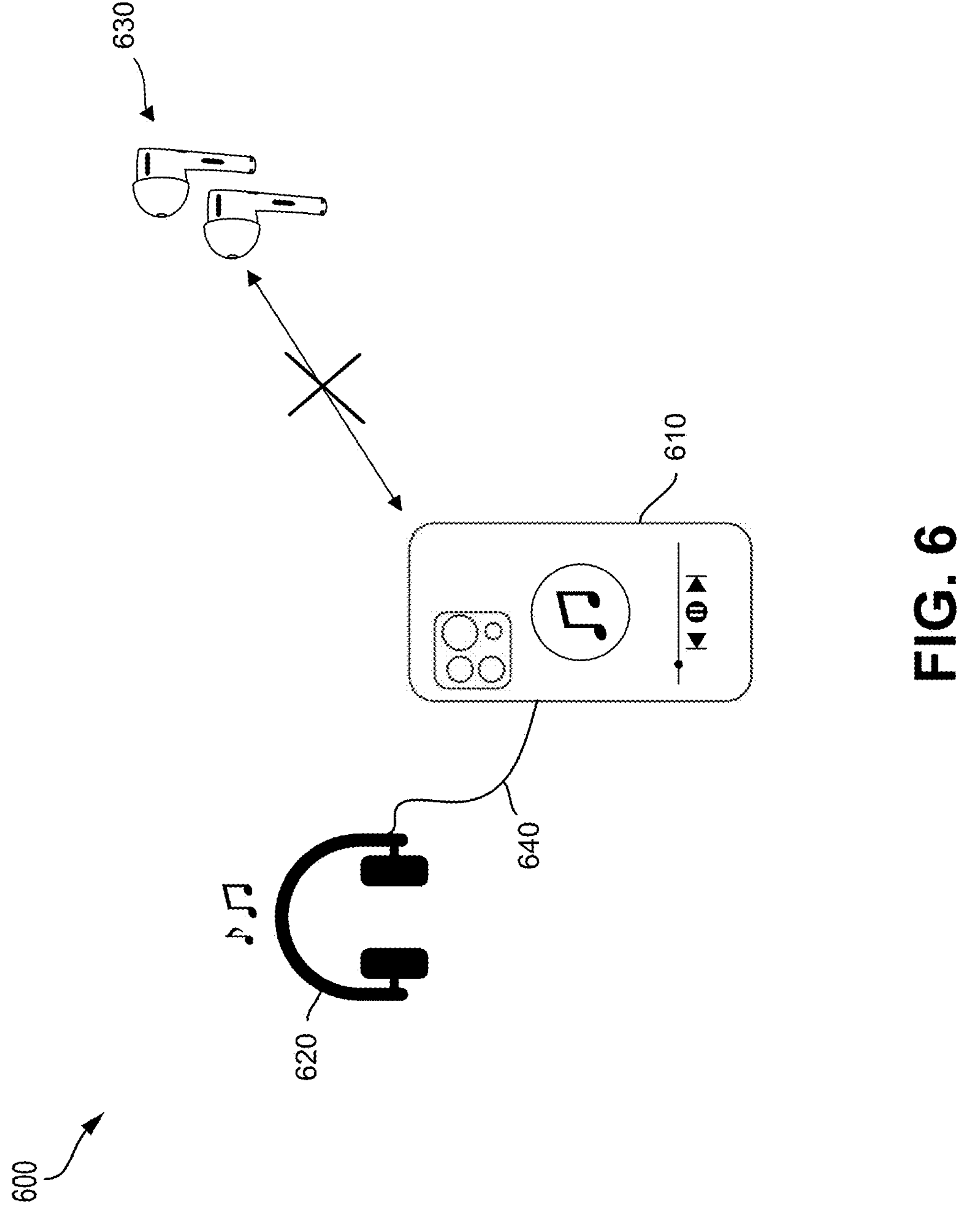
FIG. 6 is a diagram illustrating an example of a scenario where a computing device is attempting to provide simultaneous playback of audio on a wired audio device and a wireless audio device, in accordance with some aspects of the present disclosure.

Another example scenario for streaming audio is shown in FIG. 6. In particular, FIG. 6 is a diagram illustrating an example of a scenario 600 where a computing device 610 is attempting to provide simultaneous playback of audio on a wired audio device 620 and a wireless audio device 630. For the scenario 600 of FIG. 6, a computing device 610, associated with a first person, is depicted as a mobile communication device (e.g., a mobile phone, such as a smartphone), but can be any electronic device that can transmit audio data to a wireless audio device (e.g., wireless audio device 630, such as a pair of wireless earphones or earbuds). Other, non-limiting examples of suitable computing devices 610 include, but are not limited to, a laptop computer, a desktop computer, a tablet device or computer, a television, a smartwatch, an audio system, a video player, etc. In FIG. 6, a wired audio device 620 (e.g., wired headset), associated with the first person, is shown to be connected (e.g., via wire 640) to the computing device 610.

In FIG. 6, the first person is playing audio (e.g., a song) on his associated computing device 610. The first person is simultaneously listening to the audio on his associated wired audio device 620. A second person, located within close proximity to the first person (e.g., within BLE communications range), would like to simultaneously listen to (e.g., stream to play) the audio on their associated wireless audio device 630. Currently, there is no wireless technology that allows for simultaneous playback (e.g., streaming) of audio on a wired audio device (e.g., wired headset) and on a wireless audio device (e.g., a pair of wireless earphones or earbuds). As shown in FIG. 6, the computing device 610 is able to stream (e.g., via wire 640) the audio data to the wired audio device 620 for a simultaneous playback of the audio, but is not able to simultaneously stream the audio data to the wireless audio device 630.

Figure 7:
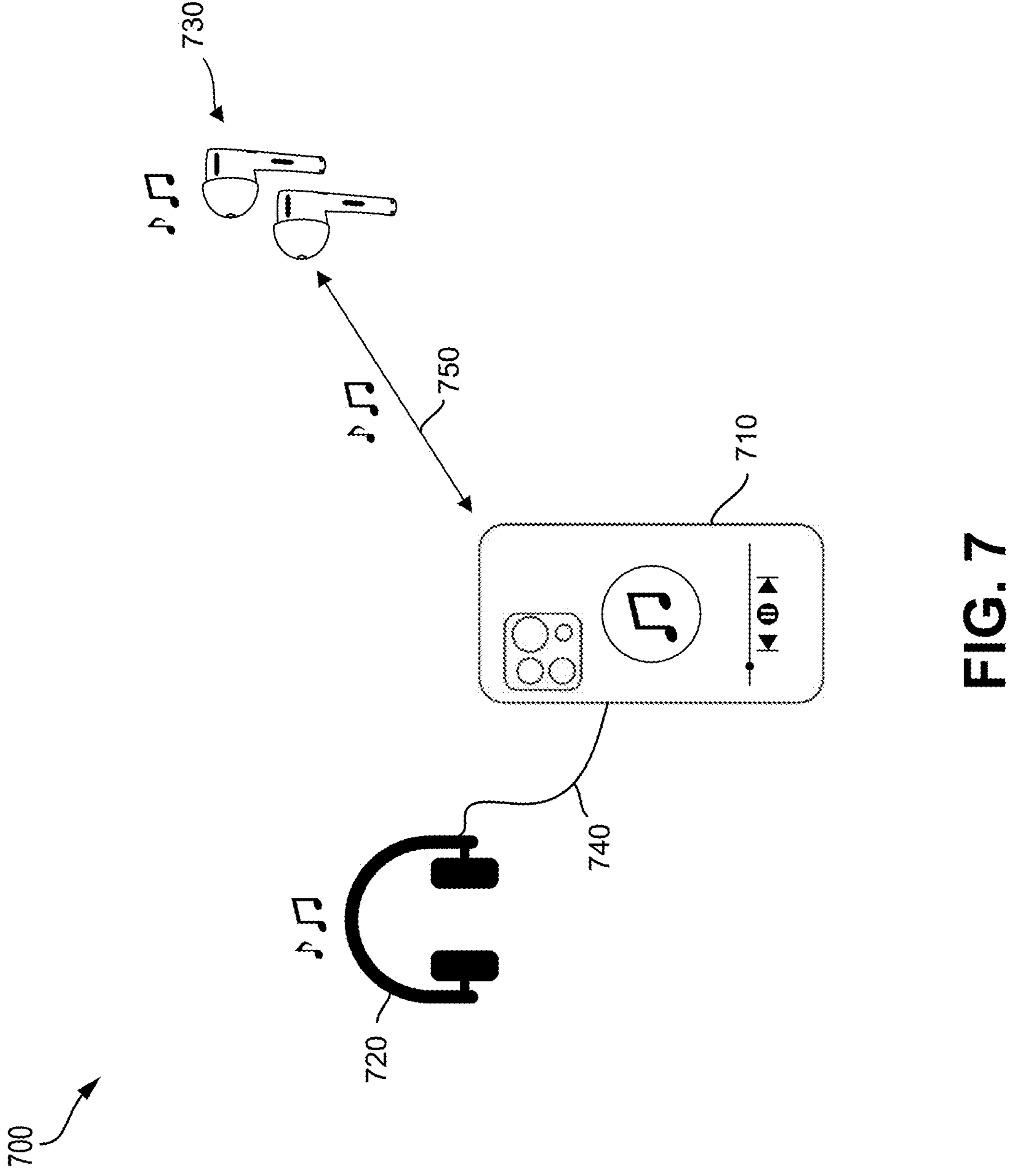
FIG. 7 is a diagram illustrating an example of a scenario where a computing device is providing simultaneous playback of audio on a wired audio device and a wireless audio device, in accordance with some aspects of the present disclosure.

The systems and techniques allow for the simultaneous playback (e.g., streaming) of audio on a wired audio device (e.g., wired headset) and on a wireless audio device (e.g., earbuds) by using a communications protocol (e.g., the DCF protocol) over a wireless channel (e.g., a Bluetooth channel). FIG. 7 shows an example of using a communications protocol (e.g., the DCF protocol) to allow for this feature. In particular, FIG. 7 is a diagram illustrating an example of a scenario 700 where a computing device 710 (e.g., a mobile phone, tablet device, television, etc.) is providing simultaneous playback of audio on a wired audio device 720 (e.g., wired headset) and a wireless audio device 730 (e.g., a pair of wireless earphones or earbuds). The DCF protocol (e.g., over a wireless channel, such as a Bluetooth channel) can be employed by the computing device 710 and the wireless audio device 730 in order to enable the simultaneous playback of audio on a wired device 720 and on the wireless devices 730.

In FIG. 7 (e.g., similar to FIG. 6), the computing device 710, associated with a first person, is depicted as a mobile communication device (e.g., a mobile phone, such as a smartphone). A wired audio device 720, associated with the first person, is shown to be connected (e.g., via wire 740) to the computing device 710. The first person is playing audio (e.g., a song) on his associated computing device 710, and the first person is simultaneously listening to the audio on his associated wired audio device 720. A second person, located within close proximity to the first person (e.g., within a range for BLE communications), would like to simultaneously listen to (e.g., stream to play) the audio on their associated wireless audio device 730.

In one or more examples, a DCF module may be operating on the computing device 710 and the wireless audio device 730. The computing device 710 can stream (e.g., as denoted by arrow 750) audio data (e.g., audio data packets) to the wireless audio device 730 via the DCF protocol over a wireless channel (e.g., Bluetooth channel). After receiving the audio data, the wireless audio device 520*a* can simultaneously play the audio associated with the audio data packets. As such, using the DCF protocol over a wireless channel (e.g., Bluetooth channel) via a wireless connection between the computing device 710 and the wireless audio device 730, the computing device 710 is able to simultaneously stream audio data on the wired audio device 720 and on a wireless audio device 730 for simultaneous playback of the audio.

Figure 8:
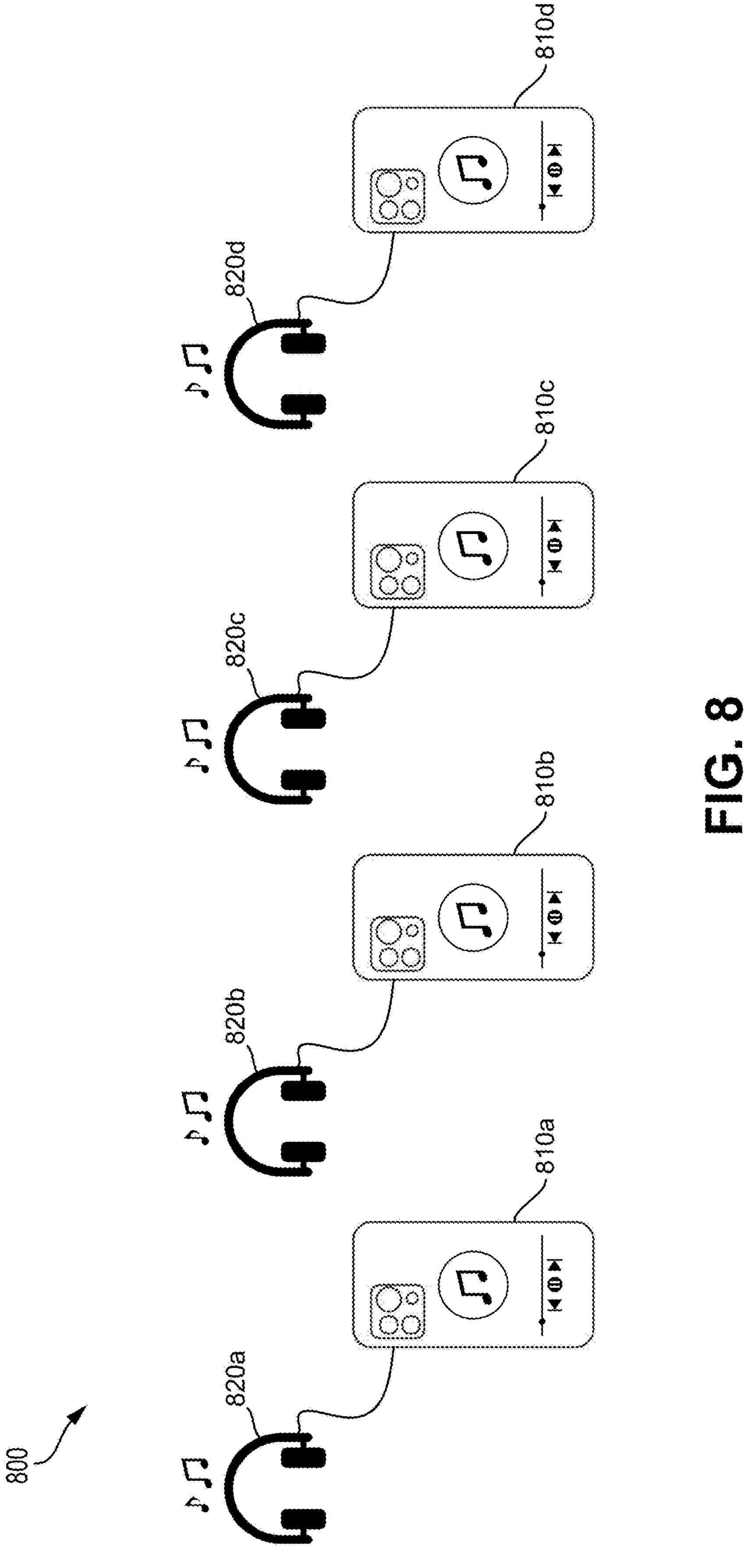
FIG. 8 is a diagram illustrating an example of a scenario where a computing device is attempting to provide simultaneous playback of audio on more than one wired audio device, in accordance with some aspects of the present disclosure.

Another example scenario for streaming audio is shown in FIG. 8. In particular, FIG. 8 is a diagram illustrating an example of a scenario 800 where a computing device 810*a* is attempting to provide simultaneous playback of audio on more than one wired audio device 820*a*, 820*b*, 820*c*, 820*d*. For the scenario 800 of FIG. 8, a group of people are gathered in close proximity to one another (e.g., within BLE communications range). In FIG. 8, the computing device 810*a* is associated with a first person of the group of people, the computing device 810*b* is associated with a second person of the group of people, the computing device 810*c* is associated with a third person of the group of people, and the computing device 810*d* is associated with a fourth person of the group of people. The computing devices 810*a*, 810*b*, 810*c*, 810*d* are each depicted as a mobile communication device (e.g., a mobile phone, such as a smartphone), but can be any electronic device that can transmit audio data to wired audio devices (e.g., wired audio devices 820*a*, 820*b*, 820*c*, 820*d*). Other, non-limiting examples of suitable computing devices 810*a*, 810*b*, 810*c*, 810*d* include, but are not limited to, a laptop computer, a desktop computer, a tablet computer, a smartwatch, an audio system, a video player, etc. In FIG. 8, the wired audio device 820*a* (e.g., wired headset), associated with the first person, is shown to be connected (e.g., via wire) to the computing device 810*a*; the wired audio device 820*b* (e.g., wired headset), associated with the second person, is shown to be connected (e.g., via wire) to the computing device 810*b*; the wired audio device 820*c* (e.g., wired headset), associated with the third person, is shown to be connected (e.g., via wire) to the computing device 810*c*; and the wired audio device 820*d* (e.g., wired headset), associated with the fourth person, is shown to be connected (e.g., via wire) to the computing device 810*d*.

In FIG. 8, the group of people are gathered in close proximity to one another, where each person has a respective associated computing device 810*a*, 810*b*, 810*c*, 810*d* (e.g., mobile phone). The first person in the group is playing audio (e.g., a song) on his associated computing device 810*a* and on his associated wired audio device 820*a*. The other people (e.g., the second person, third person, and the fourth person) in the group would like to simultaneously listen to (e.g., stream to play) the audio on their respective associated wired audio devices 820*b*, 820*c*, 820*d*, which are connected to their respective associated computing devices 810*b*, 810*c*, 810*d*. Currently, there is no wireless technology that allows for the simultaneous streaming of audio data from a computing device to more than one wired audio device (e.g., wired headset) for simultaneous playback of the audio. As shown in FIG. 8, the computing device 810*a* is only able to stream audio data to the wired audio device 820*a* (e.g., wired headset) connected to the computing device 810*a*.

Figure 9:
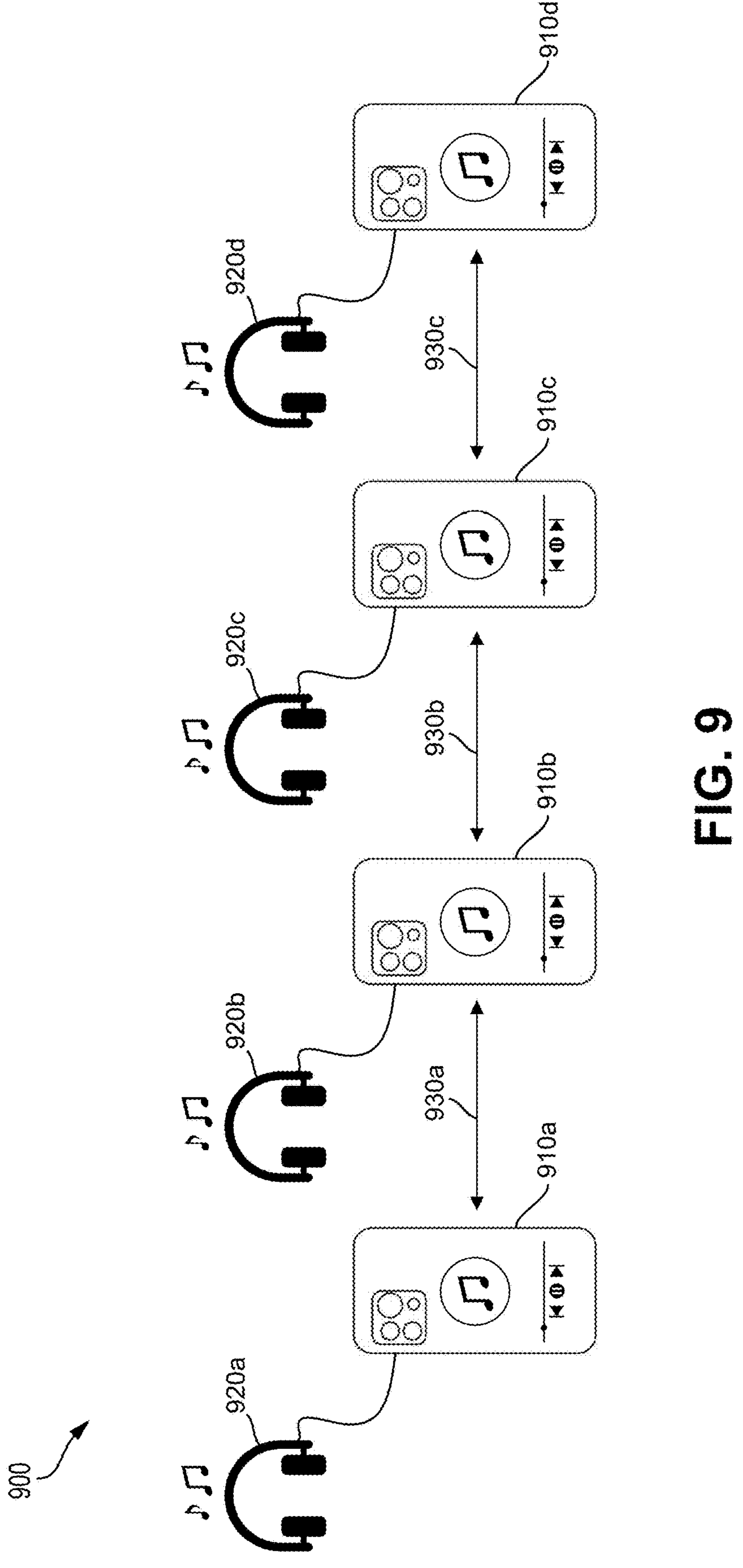
FIG. 9 is a diagram illustrating an example of a scenario where a computing device is providing simultaneous playback of audio on more than one wired audio device, in accordance with some aspects of the present disclosure.

The systems and techniques allow for the simultaneous playback (e.g., streaming) of audio from a computing device to more than one wired audio device (e.g., wired headset) by using a communications protocol (e.g., the DCF protocol) over a wireless channel (e.g., a Bluetooth channel). FIG. 9 shows an example of using a communication protocol (e.g., the DCF protocol) to allow for this feature. In particular, FIG. 9 is a diagram illustrating an example of a scenario 900 where a computing device 910*a* is providing simultaneous playback of audio on more than one wired audio device 920*a*, 920*b*, 920*c*, 920*d*. The DCF protocol (e.g., over a wireless channel, such as a Bluetooth channel) can be employed by the computing devices 910*a*, 910*b*, 910*c*, 910*d* of FIG. 9 in order to enable the simultaneous playback of audio from a computing device (e.g., computing device 910*a*) to more than one wired audio device 920*a*, 920*b*, 920*c*, 920*d* (e.g., wired headset)

In FIG. 9 (e.g., similar to FIG. 8), a group of people are gathered in close proximity to one another (e.g., within a range of BLE communications). In FIG. 9, the computing device 910*a* is associated with a first person of the group of people, the computing device 910*b* is associated with a second person of the group of people, the computing device 910*c* is associated with a third person of the group of people, and the computing device 910*d* is associated with a fourth person of the group of people. The computing devices 910*a*, 910*b*, 910*c*, 910*d* are each depicted as a mobile communication device (e.g., a mobile phone, such as a smartphone), but can include any other type of computing device.

In FIG. 9, the wired audio device 920*a*, associated with the first person, is shown to be connected (e.g., via wire) to the computing device 910*a*. The wired audio device 920*b*, associated with the second person, is shown to be connected (e.g., via wire) to the computing device 910*b*. The wired audio device 920*c*, associated with the third person, is shown to be connected (e.g., via wire) to the computing device 910*c*. The wired audio device 920*d*, associated with the fourth person, is shown to be connected (e.g., via wire) to the computing device 910*d*.

In FIG. 9, the group of people are gathered in close proximity to one another, where each person has a respective associated computing device 910*a*, 910*b*, 910*c*, 910*d*. The first person in the group is playing audio (e.g., a song) on his associated computing device 910*a*. The computing device 910*a*, associated with the first person, is outputting (e.g., streaming) audio data packets to the associated wired audio device 920*a* for playing the audio simultaneously. The other people (e.g., the second person, third person, and the fourth person) in the group would like to simultaneously listen to (e.g., stream to play) the audio on their respective associated wired audio devices 920*b*, 920*c*, 920*d*, which are connected to their respective associated computing devices 910*b*, 910*c*, 910*d*.

In one or more examples, a DCF module may be operating on the computing devices 910*a*, 910*b*, 910*c*, 910*d*. The computing device 910*a* is connected to the computing device 910*b* via the DCF protocol over a wireless channel (e.g., Bluetooth channel), the computing device 910*b* is connected to the computing device 910*c* via the DCF protocol over a wireless channel (e.g., Bluetooth channel), and the computing device 910*c* is connected to the computing device 910*d* via the DCF protocol over a wireless channel (e.g., Bluetooth channel).

The computing device 910*a* can stream (e.g., as denoted by arrow 930*a*) audio data (e.g., audio data packets) to the computing device 910*b* via the DCF protocol over a wireless channel (e.g., Bluetooth channel). After receiving the audio data, the computing device 910*b* can output (e.g., stream) the audio data to the associated wired audio device 920*b* for playing the audio simultaneously. The computing device 910*b* can stream (e.g., as denoted by arrow 930*b*) audio data to the computing device 910*c* via the DCF protocol over a wireless channel (e.g., Bluetooth channel). After receiving the audio data, the computing device 910*c* can output (e.g., stream) the audio data to the associated wired audio device 920*c* for playing the audio simultaneously. The computing device 910*c* can stream (e.g., as denoted by arrow 930*c*) the audio data to the computing device 910*d* via the DCF protocol over a wireless channel (e.g., Bluetooth channel). After receiving the audio data, the computing device 910*d* can output (e.g., stream) the audio data to the associated wired audio device 920*d* for playing the audio simultaneously. As such, the computing device 910*a* is able to simultaneously stream audio data packets to the wired audio devices 920*a*, 920*b*, 920*c*, 920*d* such that the wired audio devices 920*a*, 920*b*, 920*c*, 920*d* can simultaneously play the audio.

As previously mentioned, the systems and techniques can employ a communications protocol (e.g., the DCF protocol) in conjunction with wireless communications (e.g., BLE communications) to be able to simultaneously stream audio data (e.g., monophonic or stereophonic audio data) from a computing device (e.g., a broadcast source device, such as in the form of a mobile phone) to a plurality of audio devices (e.g., a wired headsets and/or wireless earbuds) for simultaneous playback of the audio. In one or more examples, computing devices (e.g., mobile phones) and wireless audio devices (e.g., pairs of wireless earphones or earbuds) need to be enabled for the communications protocol (e.g., DCF protocol). In some examples, when devices are enabled for the communications protocol (e.g., DCF protocol), the devices may perform an automatic (auto) discovery using the protocol of other enabled devices (e.g., other devices enabled for the communications protocol) that are within their vicinity (e.g., within a BLE communications range). Communications between enabled computing devices and enabled wireless audio devices can be seamless due to the auto discovery feature of the enabled devices. After detecting the presence of another enable device (e.g., by using the auto discovery feature of the protocol), an enabled device can connect with the detected enabled device over a wireless channel (e.g., a Bluetooth channel) such that audio data (e.g., audio data packets) can be distributed across the enabled devices.

In one or more aspects, the DCF protocol is based on BLE extended advertising. DCF enabled devices can automatically detect the presence of other nearby DCF enabled devices, and can share contexts (e.g., data, such as including notifications or status of devices) with each other.

Figure 10:
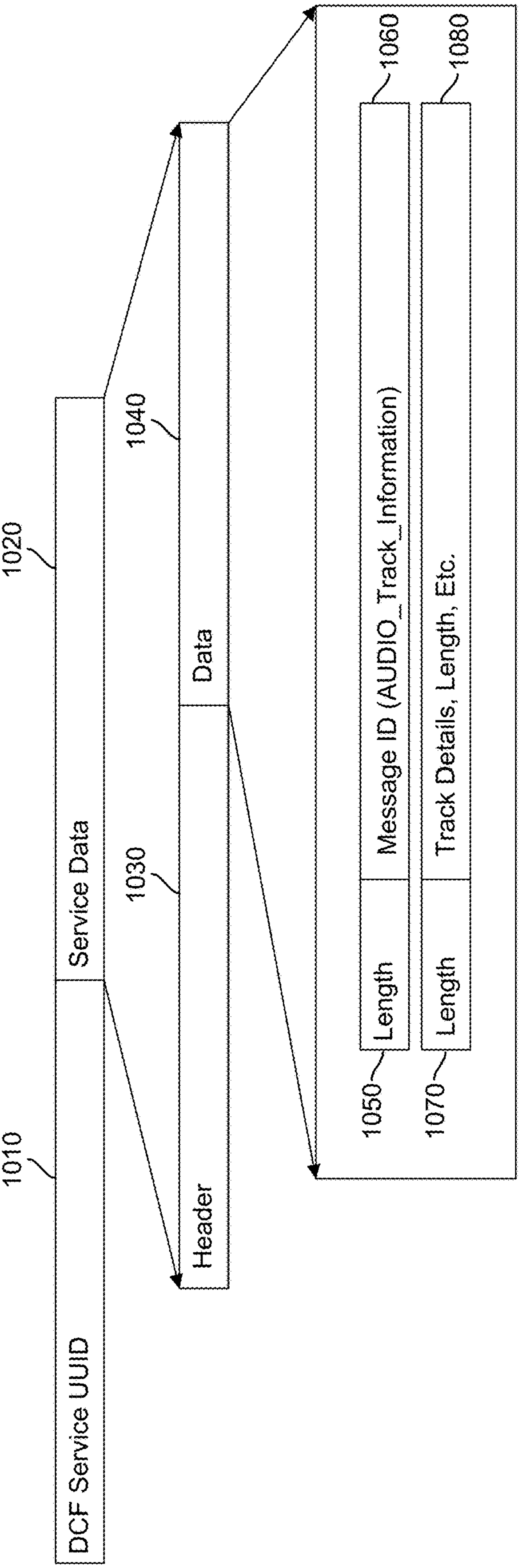
FIG. 10 is a diagram illustrating an example of a format for a distributed context fabriq (DCF) message using DCF protocol, in accordance with some aspects of the present disclosure.

FIG. 10 is a diagram illustrating an example of a format for a distributed context fabriq (DCF) message 1000 using DCF protocol. In particular, FIG. 10 shows the format for a typical DCF message 1000 that is being advertised (e.g., in the BLE extended advertising). In FIG. 10, the DCF message 1000 is shown to include a DCF service universally unique identifier (UUID) section 1010 and a service data section 1020. The service data portion 1020 is shown to include a header section 1030 and a data section 1040 (e.g., which may include the audio data packets). The data section 1040 is shown to include a length section 1050 followed by a message identification (ID) section 1060 (e.g., AUDIO_Track_Information data) as well as another length section 1070 followed by a track details, length, etc. section 1080. In one or more examples, after a device receives a DCF message (e.g., DCF message 1000) from another device, the device can decode the DCF message in order using the DCF protocol.

FIG. 11 is a flow chart illustrating an example of a process 1100 for audio relay across multiple devices. The process 1100 can be performed by a first computing device (e.g., host device 310 of FIG. 3, computing devices 810*a*, 810*b*, 810*c*, 810*d* of FIG. 8, computing devices 910*a*, 910*b*, 910*c*, 910*d* of FIG. 9, or a computing device or computing system 1200 of FIG. 12) or by a component or system (e.g., a chipset, one or more processors such as one or more central processing units (CPUs), digital signal processors (DSPs), graphics processing units (GPUs), any combination thereof, and/or other type of processor(s), or other component or system) of the first computing device. The operations of the process 1100 may be implemented as software components that are executed and run on one or more processors (e.g., processor 1210 of FIG. 12 or other processor(s)) of the first computing device. Further, the transmission and reception of signals by the computing device in the process 1100 may be enabled, for example, by one or more antennas and/or one or more transceivers (e.g., wireless transceiver(s)).

At block 1110, the computing device (or component thereof) can receive audio data from a second computing device via a communications protocol (e.g., a distributed context fabriq (DCF) protocol or other communications protocol) over a wireless channel (e.g., a Bluetooth channel or other type of wireless channel). For example, in some aspects, the first computing device is connected to the second computing device via the communications protocol over the wireless channel. In some cases, the first computing device is a first mobile device, a first television, a first tablet computer or device, or other type of computing device. In some cases, the second computing device is a second mobile device, a second television, a second tablet computer or device, or other type of computing device.

At block 1120, the computing device (or component thereof) can output (e.g., transmit or otherwise output), to a first audio device associated with the first computing device, the audio data for playing the audio data. For example, the computing device (or component thereof) can output the audio data to the first audio device via one of a wired connection or a wireless connection. In some aspects, the computing device (or component thereof) can output the audio data to the first audio device via the communications protocol over the wireless channel. The audio data is played simultaneously on the first audio device associated with the first computing device and on a second audio device associated with the second computing device. In some cases, the first audio device is a first wired headset or first wireless earbuds (e.g., a first pair of wireless earbuds or earphones) and the second audio device is a second wired headset or second wireless earbuds (e.g., a second pair of wireless earbuds or earphones).

In some cases, the computing device of process 1100 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1100 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1100 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
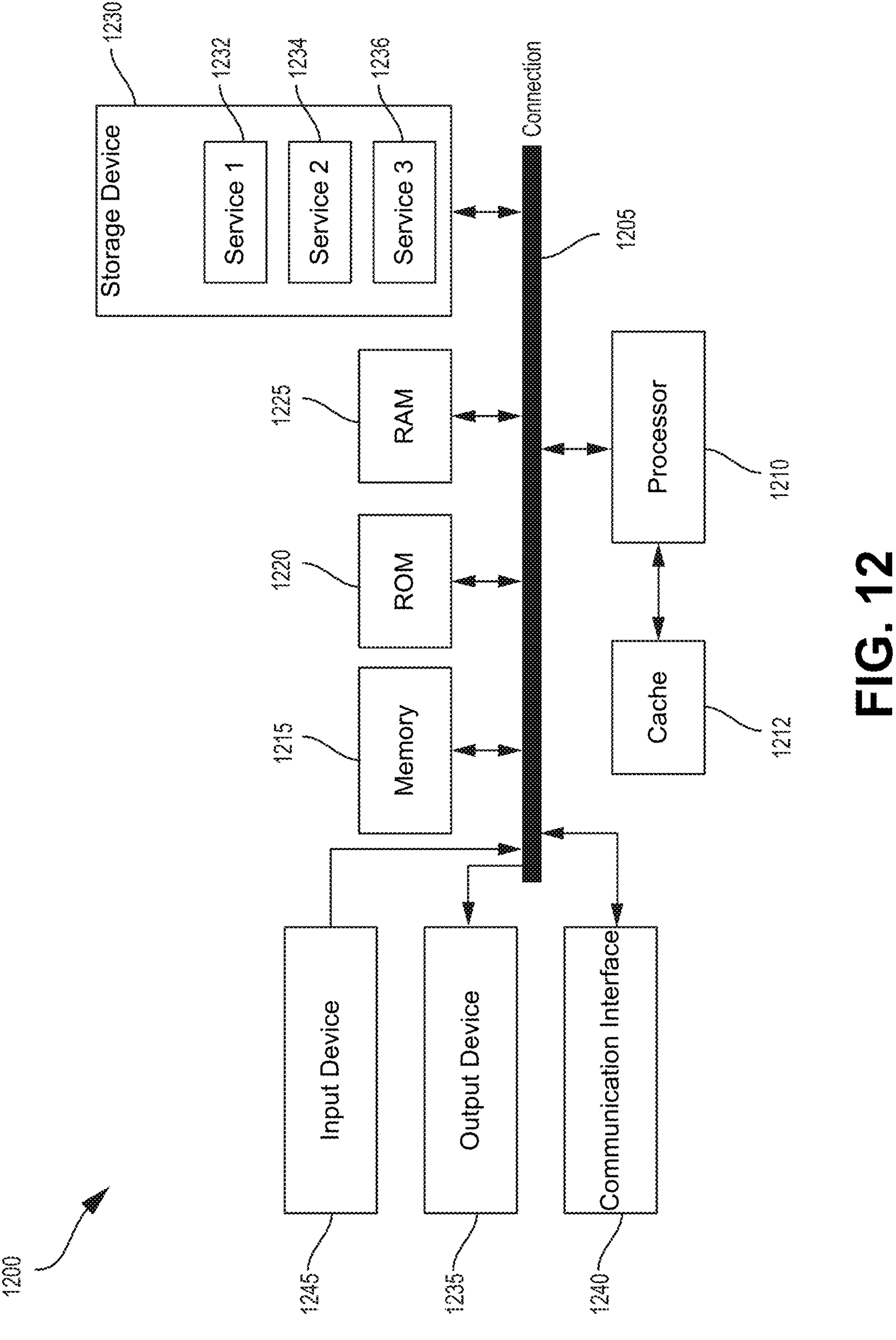
FIG. 12 is a block diagram illustrating an example computing system, in accordance with some aspects of the present disclosure.

FIG. 12 is a block diagram illustrating an example of a computing system 1200, which may be employed for audio relay across multiple devices. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that communicatively couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200.

Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more range sensors (e.g., LIDAR sensors, laser range finders, RF radars, ultrasonic sensors, and infrared (IR) sensors) configured to collect data and provide measurements to processor 1210, whereby processor 1210 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A first computing device for processing audio, the first computing device comprising: at least one memory; and at least one processor coupled to the at least one memory and configured to: receive audio data from a second computing device via a communications protocol over a wireless channel; and output, to a first audio device associated with the first computing device, the audio data for playing the audio data, wherein the audio data is played simultaneously on the first audio device associated with the first computing device and on a second audio device associated with the second computing device.

Aspect 2. The first computing device of Aspect 1, wherein the first computing device is connected to the second computing device via the communications protocol over the wireless channel.

Aspect 3. The first computing device of any of Aspects 1 or 2, wherein the at least one processor is configured to output the audio data to the first audio device via one of a wired connection or a wireless connection.

Aspect 4. The first computing device of any of Aspects 1 to 3, wherein the at least one processor is configured to output the audio data to the first audio device via the communications protocol over the wireless channel.

Aspect 5. The first computing device of any of Aspects 1 to 4, wherein the first audio device and the second audio device are each one of a wired headset or wireless earbuds.

Aspect 6. The first computing device of any of Aspects 1 to 5, wherein the first computing device is a first mobile device or a first television and the second computing device is a second mobile device or a second television.

Aspect 7. The first computing device of any of Aspects 1 to 6, wherein the communications protocol is a distributed context fabriq (DCF) protocol.

Aspect 8. The first computing device of any of Aspects 1 to 7, wherein the wireless channel is a Bluetooth channel.

Aspect 9. A method for processing audio at a first computing device, the method comprising: receiving, by the first computing device, audio data from a second computing device via a communications protocol over a wireless channel; and outputting, by the first computing device to a first audio device associated with the first computing device, the audio data for playing the audio data, wherein the audio data is played simultaneously on the first audio device associated with the first computing device and on a second audio device associated with the second computing device.

Aspect 10. The method of Aspect 9, wherein the first computing device is connected to the second computing device via the communications protocol over the wireless channel.

Aspect 11. The method of any of Aspects 9 or 10, wherein the audio data is output from the first computing device to the first audio device via one of a wired connection or a wireless connection.

Aspect 12. The method of any of Aspects 9 to 11, wherein the audio data is transmitted from the first computing device to the first audio device via the communications protocol over the wireless channel.

Aspect 13. The method of any of Aspects 9 to 12, wherein the first audio device and the second audio device are each one of a wired headset or wireless earbuds.

Aspect 14. The method of any of Aspects 9 to 13, wherein the first computing device is a first mobile device or a first television and the second computing device is a second mobile device or a second television.

Aspect 15. The method of any of Aspects 9 to 14, wherein the communications protocol is a distributed context fabriq (DCF) protocol.

Aspect 16. The method of any of Aspects 9 to 15, wherein the wireless channel is a Bluetooth channel.

Aspect 17. A non-transitory computer-readable medium of a first computing device having stored thereon instructions that, when executed by at least one processor, cause the at least one processor to: receive audio data from a second computing device via a communications protocol over a wireless channel; and output, to a first audio device associated with the first computing device, the audio data for playing the audio data, wherein the audio data is played simultaneously on the first audio device associated with the first computing device and on a second audio device associated with the second computing device.

Aspect 18. The non-transitory computer-readable medium of Aspect 17, wherein the first computing device is connected to the second computing device via the communications protocol over the wireless channel.

Aspect 19. The non-transitory computer-readable medium of any of Aspects 17 or 18, wherein the instructions, when executed by the at least one processor, cause the at least one processor to output the audio data to the first audio device via one of a wired connection or a wireless connection.

Aspect 20. The non-transitory computer-readable medium of any of Aspects 17 to 19, wherein the at least one processor is configured to output the audio data to the first audio device via the communications protocol over the wireless channel.

Aspect 21. The non-transitory computer-readable medium of Aspects 17 to 20, wherein the first audio device and the second audio device are each one of a wired headset or wireless earbuds.

Aspect 22. The non-transitory computer-readable medium of Aspects 17 to 21, wherein the first computing device is a first mobile device or a first television and the second computing device is a second mobile device or a second television.

Aspect 23. The non-transitory computer-readable medium of Aspects 17 to 22, wherein the communications protocol is a distributed context fabriq (DCF) protocol.

Aspect 24. The non-transitory computer-readable medium of Aspects 17 to 23, wherein the wireless channel is a Bluetooth channel.

Aspect 25. A first computing device for processing audio, the first computing device including one or more means for performing operations according to any of Aspects 9 to 16.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A first computing device for processing audio, the first computing device comprising:
- at least one memory; and
- at least one processor coupled to the at least one memory and configured to:
  - receive audio data from a second computing device, as a source of the audio data, via a communications protocol over a wireless channel, wherein the second computing device is configured to output the audio data to a second audio device separate from and associated with the second computing device; and
  - output, to a first audio device separate from and associated with the first computing device, the audio data for playing the audio data, wherein the audio data is played simultaneously on the first audio device and the second audio device based on the first audio device receiving the audio data from the first computing device and the second audio device receiving the audio data from the second computing device.

2. The first computing device of claim 1, wherein the first computing device is connected to the second computing device via the communications protocol over the wireless channel.

3. The first computing device of claim 1, wherein the at least one processor is configured to output the audio data to the first audio device via one of a wired connection or a wireless connection.

4. The first computing device of claim 1, wherein the at least one processor is configured to output the audio data to the first audio device via the communications protocol over the wireless channel.

5. The first computing device of claim 1, wherein the first audio device and the second audio device are each one of a wired headset or wireless earbuds.

6. The first computing device of claim 1, wherein the first computing device is a first mobile device or a first television and the second computing device is a second mobile device or a second television.

7. The first computing device of claim 1, wherein the communications protocol is a distributed context fabriq (DCF) protocol.

8. The first computing device of claim 1, wherein the wireless channel is a Bluetooth channel.

9. A method for processing audio at a first computing device, the method comprising:
- receiving, by the first computing device, audio data from a second computing device, as a source of the audio data, via a communications protocol over a wireless channel, wherein the second computing device is configured to output the audio data to a second audio device separate from and associated with the second computing device; and outputting, by the first computing device to a first audio device separate from and associated with the first computing device, the audio data for playing the audio data, wherein the audio data is played simultaneously on the first audio device and the second audio device based on the first audio device receiving the audio data from the first computing device and the second audio device receiving the audio data from the second computing device.

10. The method of claim 9, wherein the first computing device is connected to the second computing device via the communications protocol over the wireless channel.

11. The method of claim 9, wherein the audio data is output from the first computing device to the first audio device via one of a wired connection or a wireless connection.

12. The method of claim 9, wherein the audio data is transmitted from the first computing device to the first audio device via the communications protocol over the wireless channel.

13. The method of claim 9, wherein the first audio device and the second audio device are each one of a wired headset or wireless earbuds.

14. The method of claim 9, wherein the first computing device is a first mobile device or a first television and the second computing device is a second mobile device or a second television.

15. The method of claim 9, wherein the communications protocol is a distributed context fabriq (DCF) protocol.

16. The method of claim 9, wherein the wireless channel is a Bluetooth channel.

17. A non-transitory computer-readable medium of a first computing device having stored thereon instructions that, when executed by at least one processor, cause the at least one processor to:

receive audio data from a second computing device, as a source of the audio data, via a communications protocol over a wireless channel, wherein the second computing device is configured to output the audio data to a second audio device separate from and associated with the second computing device; and output, to a first audio device separate from and associated with the first computing device, the audio data for playing the audio data, wherein the audio data is played simultaneously on the first audio device and the second audio device based on the first audio device receiving the audio data from the first computing device and the second audio device receiving the audio data from the second computing device.

18. The non-transitory computer-readable medium of claim 17, wherein the first computing device is connected to the second computing device via the communications protocol over the wireless channel.

19. The non-transitory computer-readable medium of claim 17, wherein the instructions, when executed by the at least one processor, cause the at least one processor to output the audio data to the first audio device via one of a wired connection or a wireless connection.

20. The non-transitory computer-readable medium of claim 17, wherein the first audio device and the second audio device are each one of a wired headset or wireless earbuds.

* * * * *